(12) United States Patent
Choi

(10) Patent No.: US 11,187,796 B2
(45) Date of Patent: Nov. 30, 2021

(54) METHOD AND APPARATUS FOR OPERATING RADAR

(71) Applicant: Samsung Electronics Co., Ltd., Suwon-si (KR)

(72) Inventor: Sungdo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 16/243,410

(22) Filed: Jan. 9, 2019

(65) Prior Publication Data

US 2020/0003885 A1 Jan. 2, 2020

(30) Foreign Application Priority Data

Jun. 29, 2018 (KR) .................. 10-2018-0075973

(51) Int. Cl.
*G01S 13/58* (2006.01)
*G01S 13/89* (2006.01)
*G01S 13/532* (2006.01)
*G01S 13/18* (2006.01)
*G01S 13/53* (2006.01)
*G01S 13/64* (2006.01)
*G01S 13/931* (2020.01)

(52) U.S. Cl.
CPC ............ *G01S 13/584* (2013.01); *G01S 13/18* (2013.01); *G01S 13/53* (2013.01); *G01S 13/532* (2013.01); *G01S 13/64* (2013.01); *G01S 13/89* (2013.01); *G01S 13/931* (2013.01)

(58) Field of Classification Search
CPC ...... G01S 13/584; G01S 13/89; G01S 13/931; G01S 13/18; G01S 13/53; G01S 13/532; G01S 13/64

USPC ................... 342/115, 107, 110, 113
See application file for complete search history.

(56) References Cited

U.S. PATENT DOCUMENTS

| 7,570,194 | B2 | 8/2009 | Galati |
| 7,859,463 | B2 | 12/2010 | Greverie et al. |
| 8,035,548 | B2 | 10/2011 | Hildebrandt et al. |
| 9,069,066 | B2 | 6/2015 | Butt et al. |
| 9,250,323 | B2 | 2/2016 | Ranney et al. |
| 9,759,811 | B2 | 9/2017 | Liu et al. |
| 9,791,551 | B1 * | 10/2017 | Eshraghi ................. G01S 7/038 |
| 9,880,261 | B2 | 1/2018 | Subburaj et al. |
| 9,945,943 | B2 * | 4/2018 | Stark ..................... G01S 7/4021 |
| 10,215,844 | B2 * | 2/2019 | Kim ..................... G01S 7/4026 |
| 2013/0009823 | A1 | 1/2013 | Wang |

(Continued)

OTHER PUBLICATIONS

Back-doo Zho, et al., "Indoor Positioning System Using Ultrasonic and RF," *The Journal of Korean Institute of Communications and Information Sciences*, vol. 42, No. 2, Oct. 2016, pp. 413-423 (11 pages, in English).

(Continued)

*Primary Examiner* — Erin F Heard
*Assistant Examiner* — Michael W Justice
(74) *Attorney, Agent, or Firm* — NSIP Law

(57) ABSTRACT

A radio detection and ranging (radar) operating apparatus includes: radar sensors configured to receive signals reflected from an object; and a processor configured to generate Doppler maps for the radar sensors based on the reflected signals and estimate a time difference between the radar sensors based on the generated Doppler maps.

23 Claims, 13 Drawing Sheets

(56) References Cited

U.S. PATENT DOCUMENTS

| | | | |
|---|---|---|---|
| 2013/0257643 A1* | 10/2013 | Inomata | G01S 7/023 |
| | | | 342/70 |
| 2016/0187466 A1* | 6/2016 | Kim | G01S 13/931 |
| | | | 342/59 |
| 2016/0320481 A1 | 11/2016 | Ling et al. | |
| 2018/0045819 A1 | 2/2018 | Cornic et al. | |
| 2018/0088221 A1* | 3/2018 | Yomo | G01S 13/878 |
| 2018/0088224 A1* | 3/2018 | Kishigami | H04B 7/10 |
| 2018/0172813 A1* | 6/2018 | Rao | G01S 13/343 |
| 2019/0235066 A1* | 8/2019 | Iida | H01Q 21/08 |
| 2019/0250249 A1* | 8/2019 | Raphaeli | G01S 13/284 |
| 2019/0339376 A1* | 11/2019 | Levy-Israel | G01S 13/4454 |
| 2020/0011968 A1* | 1/2020 | Hammes | G01S 13/42 |
| 2020/0064455 A1* | 2/2020 | Schroder | G01S 13/325 |

OTHER PUBLICATIONS

Extended European Search Report dated Aug. 19, 2019 in European Application No. 19153654.9 (8 pages in English).

\* cited by examiner

METHOD AND APPARATUS FOR OPERATING RADAR

CROSS-REFERENCE TO RELATED APPLICATIONS

This application claims the benefit under 35 USC § 119(a) of Korean Patent Application No. 10-2018-0075973 filed on Jun. 29, 2018 in the Korean Intellectual Property Office, the entire disclosure of which is incorporated herein by reference for all purposes.

BACKGROUND

1. Field

The following description relates to technology for operating a radio detection and ranging (radar).

2. Description of Related Art

An advanced driver assistance system (ADAS) is an assistance system to improve safety and convenience of a driver and support driving to avoid dangerous situations using sensors mounted in or out of a vehicle. The sensors used for ADAS include, for example, an infrared sensor, an ultrasonic sensor, a camera, a light detection and ranging (lidar) sensor and a radar sensor. Among these sensors, the radar sensor stably measures an object in a vicinity of the vehicle irrespective of a surrounding environment such as weather, in comparison to an optical sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a radio detection and ranging (radar) operating apparatus includes: radar sensors configured to receive signals reflected from an object; and a processor configured to generate Doppler maps for the radar sensors based on the reflected signals and estimate a time difference between the radar sensors based on the generated Doppler maps.

The processor may be further configured to extract landmark points from target points included in the Doppler maps based on Doppler velocities of the target points, and estimate the time difference between the radar sensors based on the landmark points.

The processor may be further configured to extract, as the landmark points, target points between which a Doppler velocity difference is less than a threshold velocity difference, among the target points.

The processor may be further configured to extract first landmark points having similar Doppler velocities from a first Doppler map, among the Doppler Maps, generated for a first radar sensor among the radar sensors, extract second landmark points having Doppler velocities similar to the Doppler velocities of the first landmark points from a second Doppler map, among the Doppler Maps, generated for a second radar sensor among the radar sensors, and determine a time difference between the radar sensors based on a distance between the first landmark points in the first Doppler map and a distance between the second landmark points in the second Doppler map. The distance between the first landmark points in the first Doppler map may be equal to the distance between the second landmark points in the second Doppler map.

The processor may be further configured to extract landmark points from the Doppler maps of the radar sensors and estimate the time difference based on points in time at which the radar sensors receive signals reflected from the landmark points.

The processor may be further configured to estimate the time difference based on a correlation map between a first Doppler map, among the Doppler maps, generated for a first radar sensor among the radar sensors, and a second Doppler map, among the Doppler maps, generated for a second radar sensor among the radar sensors.

The processor may be further configured to generate correlation maps while shifting one of the first Doppler map and the second Doppler map along a distance axis, search for a correlation map including a peak correlation value among the generated correlation maps, and estimate the time difference based on a correlation map obtained by the searching.

The processor may be further configured to distinguish, among the signals received by each of the radar sensors, a signal radiated from a respective radar sensor among the radar sensors and a signal radiated from another radar sensor among the radar sensors, based on the estimated time difference.

The processor may be further configured to determine distances to target points based on the estimated time difference and points in time at which the signals are received by the radar sensors.

The processor may be further configured to synchronize start times of operating intervals of the radar sensors based on the estimated time difference.

The estimating of the time difference between the radar sensors may include estimating a time difference between a first radar sensor and a second radar sensor among the radar sensors, and estimating a time difference between a third radar sensor, among the radar sensors, and one of the first radar sensor and the second radar sensor.

The processor may be further configured to re-estimate the time difference between the radar sensors, in response to a change in an operating interval of at least one of the radar sensors.

The processor may be further configured to generate the Doppler maps for the radar sensors based on frequency differences between signals radiated by respective radar sensors, among the radar sensors, and the reflected signals.

Each of the radar sensors may be further configured to externally radiate a chirp signal after frequency modulation and receive a chirp signal corresponding to the chirp signal reflected from a target point. The processor may be further configured to determine a distance from each of the radar sensors to the target point based on a frequency difference between the radiated chirp signal and the received chirp signal.

The processor may be further configured to generate a surrounding distance map based on the signals received by the radar sensors.

Each of the radar sensors may be further configured to radiate a modulated chirp signal at a different point in time.

Each of the radar sensors may be further configured to receive signals radiated by the respective radar sensor and another radar sensor and reflected from target points. The processor may be further configured to detect a contour of the object by estimating distances to the target points based on the signals radiated by the respective radar sensor and the other radar sensor.

The processor may be further configured to compensate for a velocity difference between the radar operating apparatus and another radar operating apparatus and estimate time differences between the radar sensors and radar sensors of the other radar operating apparatus.

In another general aspect, a radio detection and ranging (radar) operating method includes: receiving, by radar sensors, signals reflected from an object; generating Doppler maps for the radar sensors based on the reflected signals; and estimating a time difference between the radar sensors based on the generated Doppler maps.

In another general aspect, a non-transitory computer-readable storage medium stores instructions that, when executed by a processor, cause the processor to perform the method described above.

In another general aspect, a radio detection and ranging (radar) operating method includes: radiating, by a first radar sensor, a first signal; radiating, by a second radar sensor, a second signal; receiving, by the first radar sensor, a third signal resulting from the first signal being reflected from an object, and a fourth signal resulting from the second signal being reflected by the object; receiving, by the second radar sensor, the third signal and the fourth signal; generating a first Doppler map for the first radar sensor, based on the third and fourth signals; generating a second Doppler map for the second radar sensor, based on the third and fourth signals; and estimating a time difference between the first radar sensor and the second radar sensor based on the first Doppler map and the second Doppler map. The time difference is a difference between respective start times of respective operating intervals of the first radar sensor and the second radar sensor.

The estimating of the time difference may include merging the first Doppler map and the second Doppler map to generate a merged Doppler map, extracting, in the merged Doppler map, first landmark points from first target points of the first Doppler map and second landmark points from second target points of the second Doppler map, and estimating the time difference based on the first landmark points and the second landmark points. A Doppler velocity difference between the first landmark points may be less than a threshold velocity difference. Doppler velocities of the second landmark points are similar to Doppler velocities of the first landmark points.

The estimating of the time difference based on the first landmark points and the second landmark points may include estimating the time difference based on a distance between the first landmark points in the merged Doppler map and a distance between the second landmark points in the merged Doppler map.

In another general aspect, a non-transitory computer-readable storage medium may store instructions that, when executed by a processor, cause the processor to perform the method described above.

Other features and aspects will be apparent from the following detailed description, the drawings, and the claims.

Figure 1:
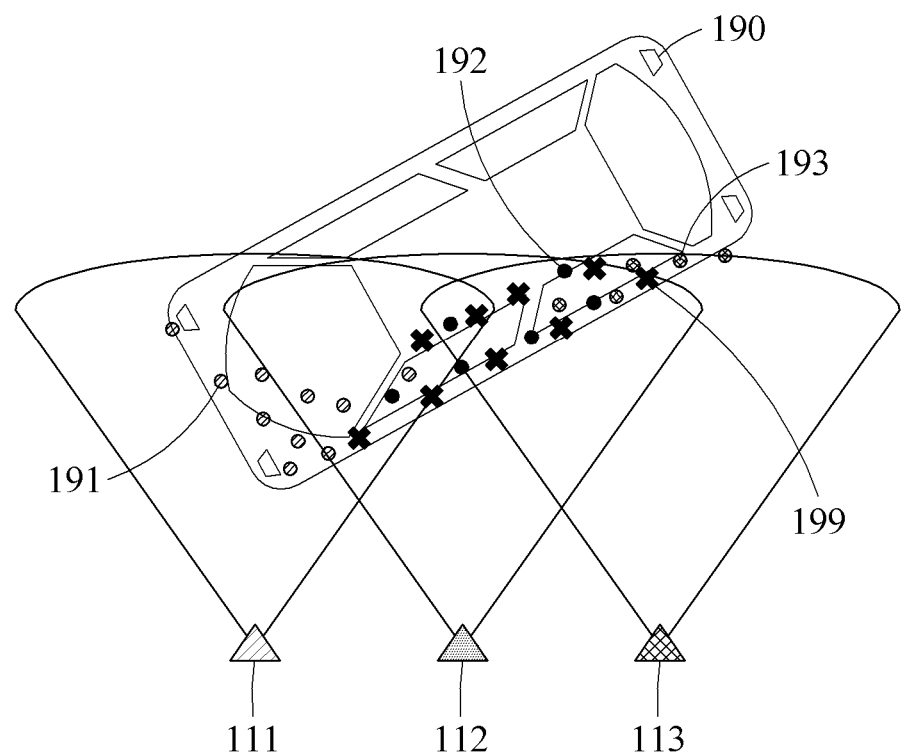
FIG. 1 illustrates an example of a radio detection and ranging (radar) system.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of a radio detection and ranging (radar) system 100.

Referring to FIG. 1, the radar system 100 senses an object 190 using, for example, a first radar sensor 111, a second radar sensor 112, and a third radar sensor 113. For example, the radar system 100 radiates signals through the first, second, and third radar sensors 111, 112, and 113 and receives signals corresponding to the radiated signals reflected from the object 190, thereby sensing the object 190. The signals radiated from the first, second, and third radar sensors 111, 112, and 113 reach predetermined points of the object 190 and then are reflected from the corresponding points. A difference between a direction in which a signal is incident on an object and a direction in which the signal is reflected is referred to as an azimuth. The signals reflected from the object 190 are received by the radar sensors. The signals received by the radar sensors include information associated with points at which the signals are reflected from the object 190. For example, the signals received by the radar sensors include information associated with distances to the points at which the corresponding signals are reflected. The points at which the signals are reflected from the object 190 are referred to as target points. The target points with respect to the object 190 indicate a contour of the object 190.

For example, the first radar sensor 111 senses a target point 191 through a homogeneous channel. The second radar sensor 112 senses a target point 192 through a homogeneous channel. The third radar sensor 113 senses a target point 193 through a homogeneous channel. The radar system 100 operates the first, second, and third radar sensors 111, 112, and 113 to cooperate with one another, thereby sensing target points 199 through heterogeneous channels.

A homogeneous channel is a channel through which a radar sensor receives a signal radiated by the radar sensor itself. A heterogeneous channel is a channel through which a radar sensor receives a signal radiated by another radar sensor.

Thus, the first, second, and third radar sensors 111, 112, and 113 of FIG. 1 each receive a signal radiated by the corresponding radar sensor itself and signals radiated by the other radar sensors. The radar system 100 operates the first, second, and third radar sensors 111, 112, and 113 cooperatively, thereby generating a surrounding distance map with an improved resolution in comparison to resolutions of the corresponding radar sensors.

Hereinafter, an operation of estimating an operating time difference between the first, second, and third radar sensors 111, 112, and 113 by the radar system 100 to process the signals received through the homogeneous channels and the heterogeneous channels will be described. For example, a radar operating apparatus of the radar system 100 will be described with reference to FIG. 2.

Figure 2:
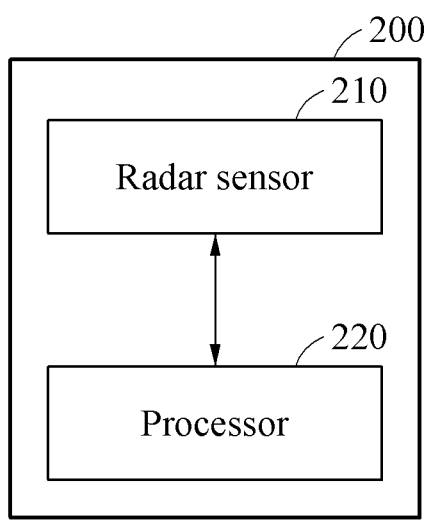
FIG. 2 illustrates an example of a configuration of a radar operating apparatus.

Referring to FIG. 2, a radar operating apparatus 200 includes a radar sensor 210 and a processor 220.

The radar sensor 210 receives a signal reflected from an object. The radar operating apparatus 200 may include radar sensors 210. As described with reference to FIG. 1, each radar sensor 210 receives a signal radiated by the radar sensor 210 itself and reflected from the object. Further, each radar sensor 210 also receives a signal radiated by another radar sensor and reflected from the object. A detailed configuration and operation of the radar sensor 210 will be described with reference to FIG. 3.

The processor 220 generates Doppler maps for the radar sensors 210 based on the reflected signals and estimates a time difference between the radar sensors 210 based on the generated Doppler maps. The time difference between the radar sensors 210 is a difference between respective start times of respective operating intervals of the radar sensors 210. An operation of the processor 220 will be described further with reference to FIGS. 3 through 13.

Figure 6:
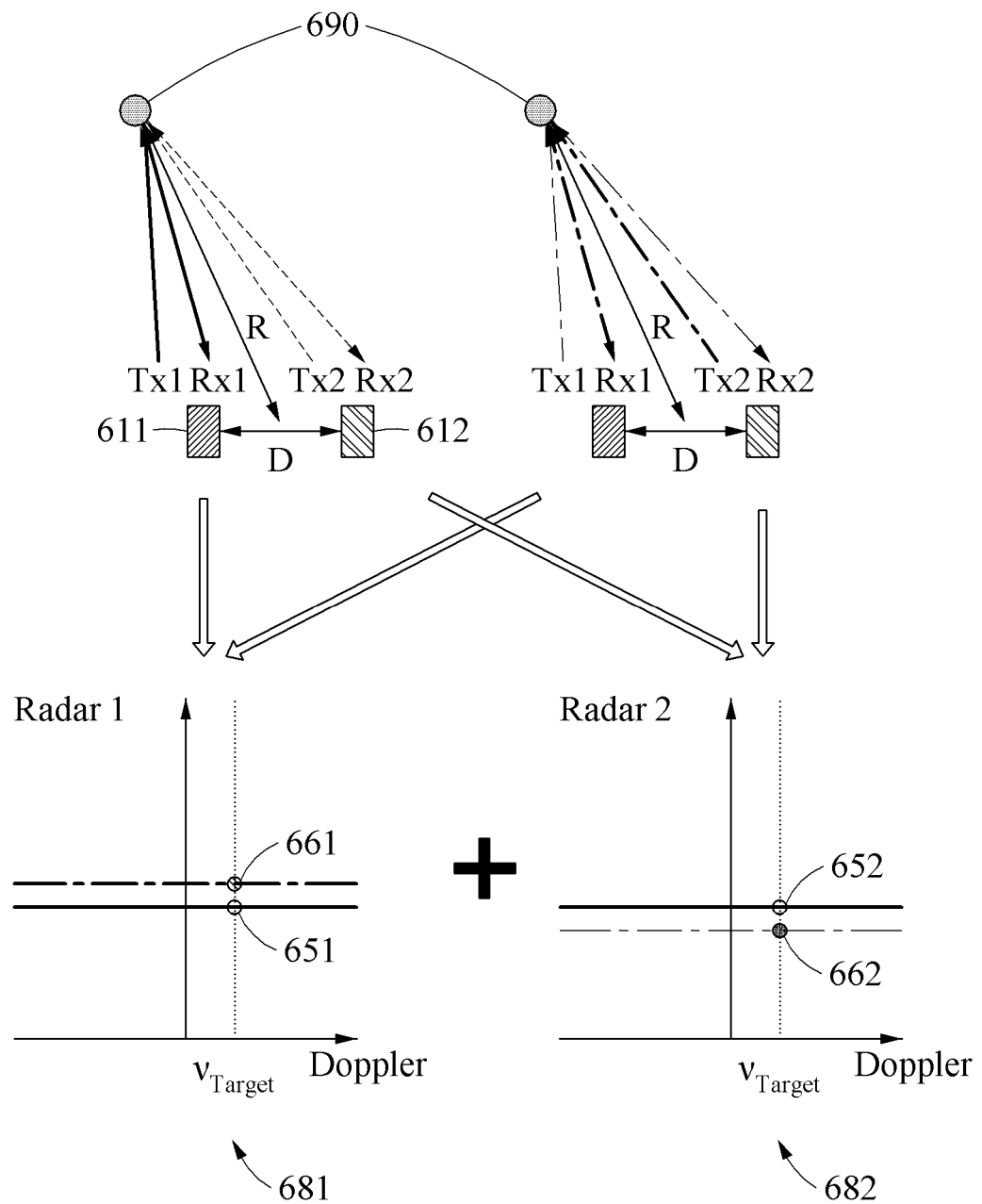
FIG. 6 illustrates an example of Doppler maps for respective radar sensors.

Herein, a Doppler map is a map indicating Doppler information of target points sensed by a predetermined radar sensor 210. A horizontal axis of the Doppler map indicates a Doppler value and a vertical axis of the Doppler map indicates a distance to a target point, as shown in FIG. 6. The Doppler value is, for example, a Doppler velocity which is a relative velocity of a target point with respect to the radar sensor 210 (for example, a difference between a velocity of the target point and a velocity of the radar sensor 210). However, the Doppler map is not limited to the disclosed example, and may change according to a suitable design. The processor 220 generates the Doppler maps based on signals received by the corresponding radar sensors 210, the signals reflected from the target points.

Figure 3:
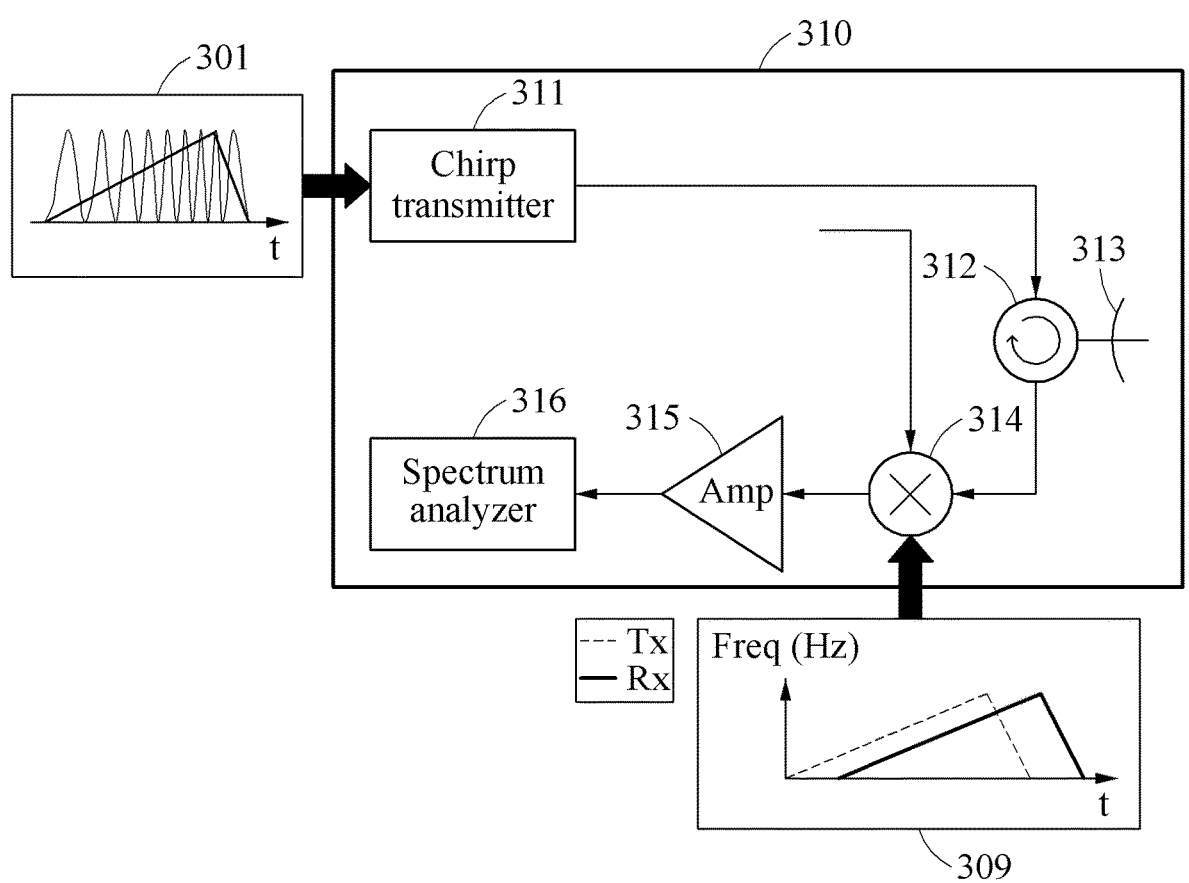
FIG. 3 illustrates an example of a configuration of a radar sensor.

FIG. 3 illustrates an example of a configuration of a radar sensor 310.

A radar sensor 310 radiates a signal through an antenna 313 and receives a signal through the antenna 313. The radar sensor 310 is, for example, a millimeter wave (mmWave) radar which measures a position of an object by analyzing a change in a signal waveform and a time of flight that a radiated electric wave needs to return after hitting an object. The radar sensor 310 senses an object in front of the radar sensor 310 irrespective of a change in external environment such as fog or rain, when compared to an optical sensor, for example, a camera. Further, the radar sensor 310 exhibits a greater cost-to-performance ratio than a light detection and ranging (lidar). For example, the radar sensor 310 is implemented as a frequency modulated continuous-wave radio detection and ranging (FMCW radar).

A chirp transmitter 311 of the radar sensor 310 generates a frequency modulated (FM) signal of which a frequency varies over time. The chirp transmitter 311 transmits a frequency modulated chirp signal 301. An amplitude of the chirp signal 301 linearly increases or decreases over time.

The radar sensor 310 radiates, through the antenna 313, the generated chirp signal 301 after frequency modulation.

The signal radiated through the antenna 313 is reflected when reaching an obstacle. The antenna 313 receives the reflected signal.

A duplexer 312 of the radar sensor 310 determines a transmission path and a reception path of the signal through the antenna 313. For example, when the chirp signal 301 is radiated, the duplexer 312 forms a signal path from the chirp transmitter 311 to the antenna 313. In an example of receiving the signal reflected from the object, the duplexer 312 forms a signal path from the antenna 313 to a spectrum analyzer 316.

A frequency mixer 314 demodulates the received signal into a linear signal before frequency modulation. An amplifier 315 amplifies an amplitude of the demodulated linear signal.

The spectrum analyzer 316 compares the incoming signal reflected from the object to the radiated chirp signal 301. The spectrum analyzer 316 detects a frequency difference between the radiated signal and the reflected signal. The radiated signal and the reflected signal show a constant frequency difference in a period in which an amplitude of the radiated signal linearly increases along a time axis of a graph 309 of FIG. 3. Since the frequency difference between the radiated signal and the reflected signal is proportional to a distance between the radar sensor 310 and the object, the distance between the radar sensor 310 and the object is derived from the frequency difference between the radiated signal and the reflected signal. The spectrum analyzer 316 transmits analyzed information to a processor of a radar operating apparatus. The analyzed information includes, for example, information about the frequency difference between the radiated signal and the reflected signal.

Multiple radar sensors 310 are respectively installed at several locations of a vehicle, and the radar operating apparatus calculates relative velocities, directions, and distances to target points with respect to all directions of the vehicle. The radar operating apparatus provides various functions, for example, adaptive cruise control (ACC), blind spot detection (BSD), and lane change assistance (LCA), which are helpful for driving, based on information obtained from information collected by the radar sensors 310.

Each of the radar sensors 310 externally radiates a chirp signal after frequency modulation and receives a chirp signal produced by the radiated chirp signal being reflected from a target point. The processor of the radar operating apparatus determines a distance from each of the radar sensors 310 to a target point, based on a frequency difference between the radiated chirp signal and the received chirp signal.

For example, each of the radar sensors 310 radiates a modulated chirp signal at a different point in time. Hereinafter, a process of estimating a time difference between radar sensors to solve interference caused by the radar sensors being used concurrently will be described.

Figure 4:
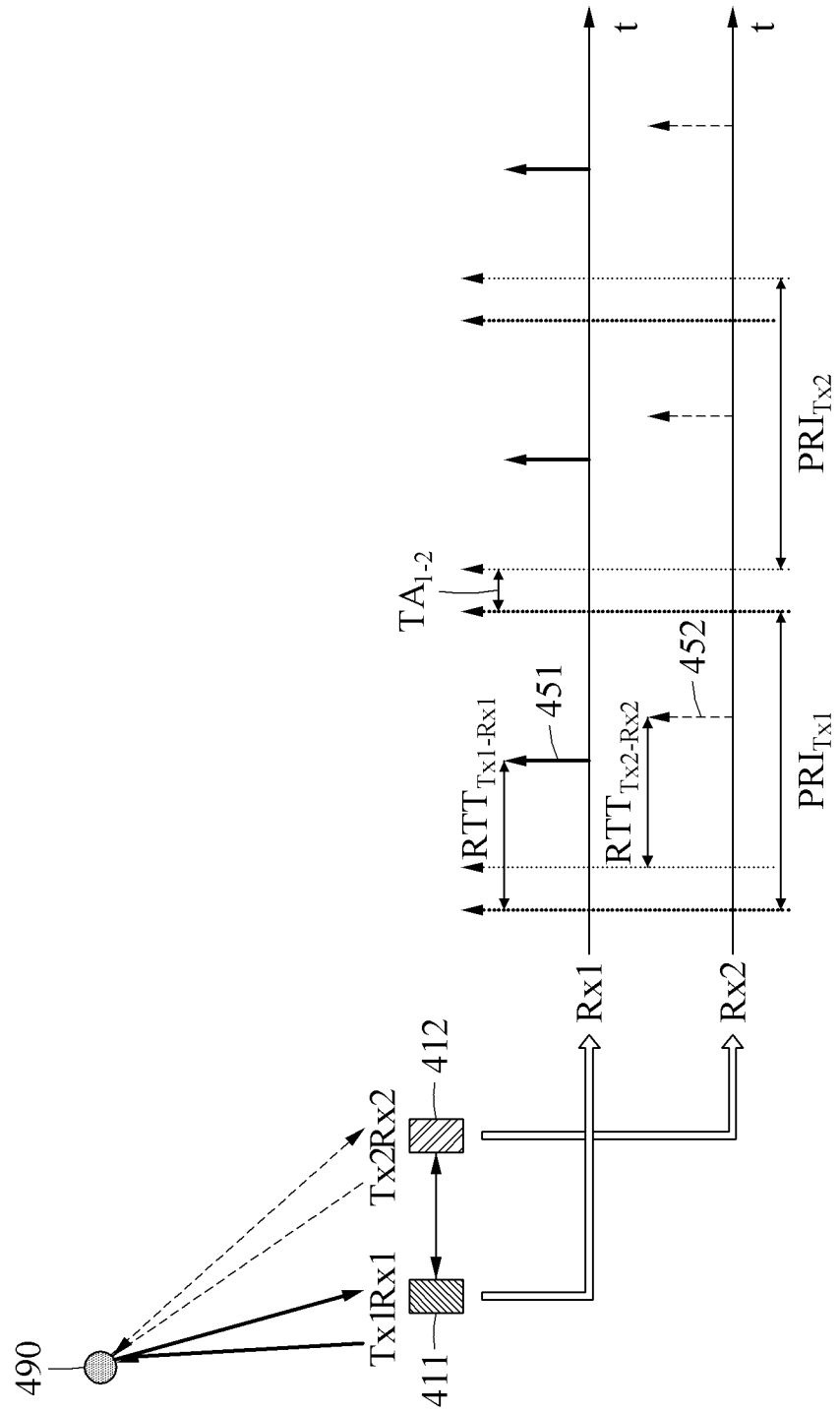
FIGS. 4 and 5 illustrate examples of points in time at which radar sensors receive signals reflected from an object.
Figure 5:
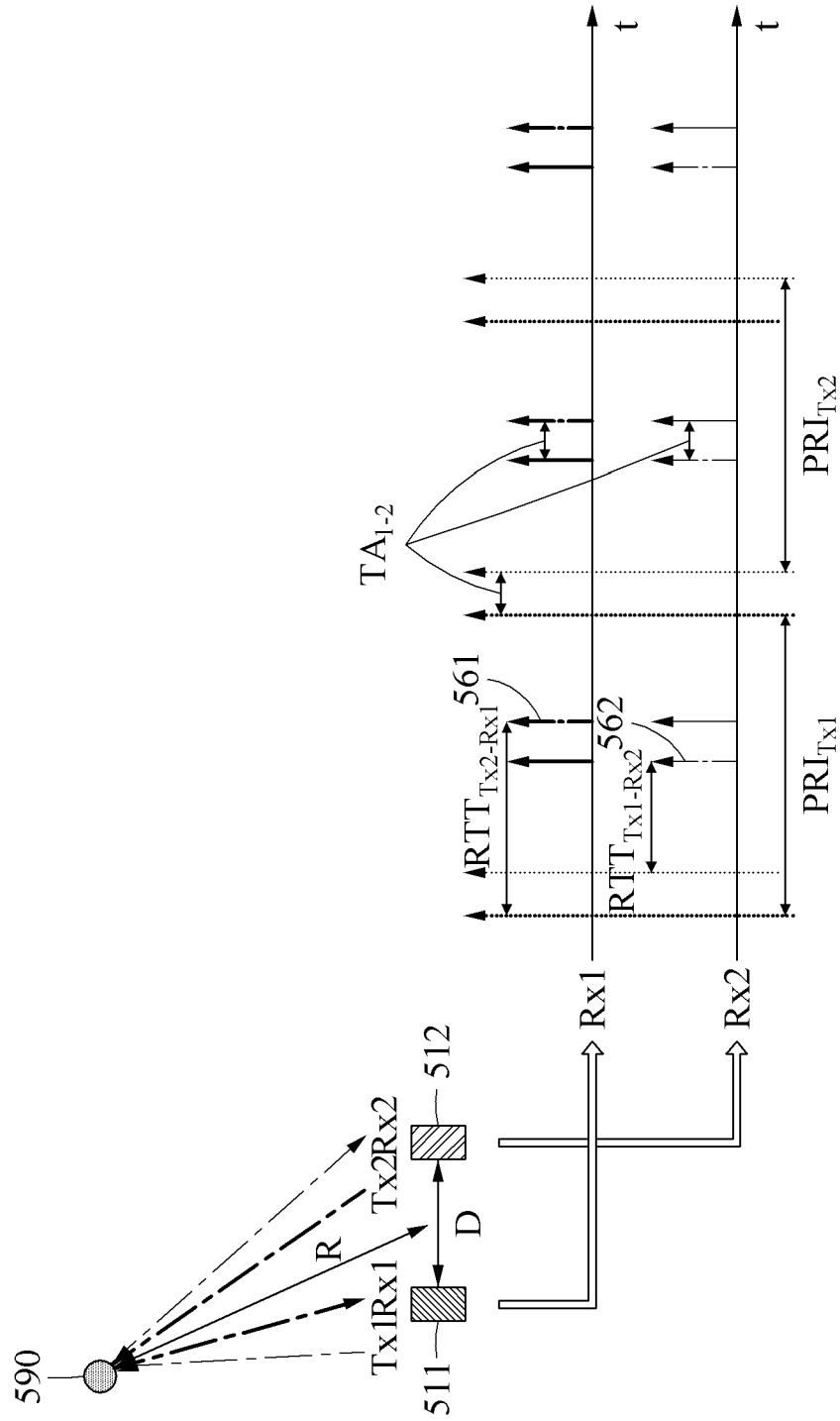

FIGS. 4 and 5 illustrate examples of points in time at which radar sensors receive signals reflected from an object.

FIG. 4 illustrates signal reception based on a homogeneous channel. In the example of FIG. 4, a first radar sensor 411 receives a first signal 451 radiated by the first radar sensor 411 itself and reflected from an object 490. A second radar sensor 412 receives a second signal 452 radiated by the second radar sensor 412 itself and reflected from the object 490. Such radars are referred to as monostatic radars.

The first radar sensor 411 receives the first signal 451 at a point in time at which a round trip time $RTT_{Tx1-Rx1}$ elapses. Further, the second radar sensor 412 receives the second signal 452 at a point in time at which a round trip time $RTT_{Tx2-Rx2}$ elapses. In the example of FIG. 4, it is assumed that the first radar sensor 411 and the second radar sensor 412 have the same pulse repetition interval (PRI). For example, an operating interval of the first radar sensor 411 corresponding to a pulse repetition frequency is denoted as $PRI_{Tx1}$, and an operating interval of the second radar sensor 412 corresponding to the pulse repetition frequency is denoted as $PRI_{Tx2}$.

In response to the a distance from the first radar sensor 411 to the object 490 and a distance from the second radar sensor 412 to the object 490 being sufficiently greater than a distance between the first and second radar sensors 411 and 412, for example, exceeding a threshold distance, the round trip time of the first signal 451 is equal to the round trip time of the second signal 452. Thus, a time difference between a point in time at which the first signal 451 is received and a point in time at which the second signal 452 is received corresponds to a time difference $TA_{1-2}$ between the first radar sensor 411 and the second radar sensor 412.

FIG. 5 illustrates signal reception based on a heterogeneous channel. In the example of FIG. 5, a first radar sensor 511 receives a third signal 561 radiated by a second radar sensor 512 and reflected from an object 590. The second radar sensor 512 receives a fourth signal 562 radiated by the first radar sensor 511 and reflected from the object 590. Such radars are referred to as multi-static radars.

The first radar sensor 511 receives the third signal 561 at a point in time at which a round trip time $RTT_{Tx2-Rx1}$ elapses. The round trip time $RTT_{Tx2-Rx1}$ is a time taken for the signal radiated from the second radar sensor 512 to reach the first radar sensor 511. The second radar sensor 512 receives the fourth signal 562 at a point in time at which a round trip time $RTT_{Tx1-Rx2}$ elapses. The round trip time $RTT_{Tx1-Rx2}$ is a time taken for the signal radiated from the first radar sensor 511 to reach the second radar sensor 512. In response to the round trip time $RTT_{Tx2-Rx1}$ and the round trip time $RTT_{Tx1-Rx2}$ being different from each other, a monostatic signal and a multi-static signal, for example, the third signal 561 and the fourth signal 562, appear concurrently, as shown in FIG. 5.

Similar to FIG. 4, in the example of FIG. 5, an operating interval $PRI_{Tx1}$ of the first radar sensor 511 and an operating interval $PRI_{Tx2}$ of the second radar sensor 512 are designed to be the same. In response to distances R from radar sensors to an object being sufficiently greater than a distance D between the first and second radar sensors 511 and 512, for example, exceeding a threshold distance, a relationship between the round trip times is expressed by Equation 1.

$$|RTT_{Tx1-Rx2} - RTT_{Tx1-Rx1}| = |RTT_{Tx2-Rx1} - RTT_{Tx2-Rx2}| \qquad \text{[Equation 1]}$$

In Equation 1, $RTT_{Tx1-Rx2}$ is a round trip time of a signal from a point in time when the signal is radiated by the first radar sensor 511 to a point in time at which the signal radiated by the first radar sensor 511 is received by the second radar sensor 512. $RTT_{Tx1-Rx1}$ is a round trip time of a signal from a point in time at which the signal is radiated by the first radar sensor 511 to a point in time at which the signal radiated by the first radar sensor 511 is received by the first radar sensor 511. $RTT_{Tx2-Rx1}$ is a round trip time of a signal from a point in time at which the signal is radiated by the second radar sensor 512 to a point in time at which the signal radiated by the second radar sensor 512 is received by the first radar sensor 511. $RTT_{Tx2-Rx2}$ is a round trip time of a signal from a point in time at which the signal is radiated by the second radar sensor 512 to a point in time at which the signal radiated by the second radar sensor 512 is received by the second radar sensor 512.

Under the condition described above, a time difference between a point in time at which each of the first and second radar sensors 511 and 512 receives a signal radiated by another radar sensor and a point in time at which the corresponding radar sensor receives a signal radiated by the radar sensor itself is a time difference $TA_{1-2}$ between the first radar sensor 511 and the second radar sensor 512.

A radar operating apparatus estimates a time difference between radar sensors using Doppler maps generated for the radar sensors, based on the principle described with reference to FIGS. 4 and 5.

FIG. 6 illustrates an example of Doppler maps for respective radar sensors.

FIG. 6 illustrates a first Doppler map 681 corresponding to a first radar sensor 611 and a second Doppler map 682 corresponding to a second radar sensor 612. In FIG. 6, a distance between the first radar sensor 611 and the second radar sensor 612 is indicated as D, and distances from the radar sensors 611 and 612 to an object 690 are indicated as R.

A horizontal axis of each Doppler map 681 and 682 indicates a Doppler value of a target point, and a vertical axis of each Doppler map indicates a distance to the target point. The Doppler value of the target point is a relative velocity of the target point with respect to the radar sensor 611/612. The distance to the target point is a distance from the radar sensor 611/612 to the target point. The Doppler map 681/682 corresponding to each radar sensor 611/612 includes a point corresponding to a signal radiated by the corresponding radar sensor 611/612 and a point corresponding to a signal radiated by the other radar sensor 612/611. For example, a processor of the radar operating apparatus generates the Doppler 681 and 682 maps for the radar sensors 611 and 612 based on frequency differences between the signals radiated by the corresponding radar sensors 611 and 612 and the reflected signals.

For example, the first Doppler map 681 generated for the first radar sensor 611 shows target points 651 and 661 indicated by the signals received by the first radar sensor 611. The first Doppler map 681 shows the target point 651 corresponding to the signal radiated by the first radar sensor 611 and the target point 661 corresponding to the signal radiated by the second radar sensor 612.

The second Doppler map 682 generated for the second radar sensor 612 shows target points 652 and 662 indicated by the signals received by the second radar sensor 612. For example, the second Doppler map 682 shows the target point 652 corresponding to the signal radiated by the second radar sensor 612 and the target point 662 corresponding to the signal radiated by the first radar sensor 611.

The target points 651, 652, 661 and 662 of FIG. 6 are sensed from the signals reflected from the same object 690. Thus, the target points 651, 652, 661 and 662 have the same Doppler value $V_{target}$.

Figure 7:
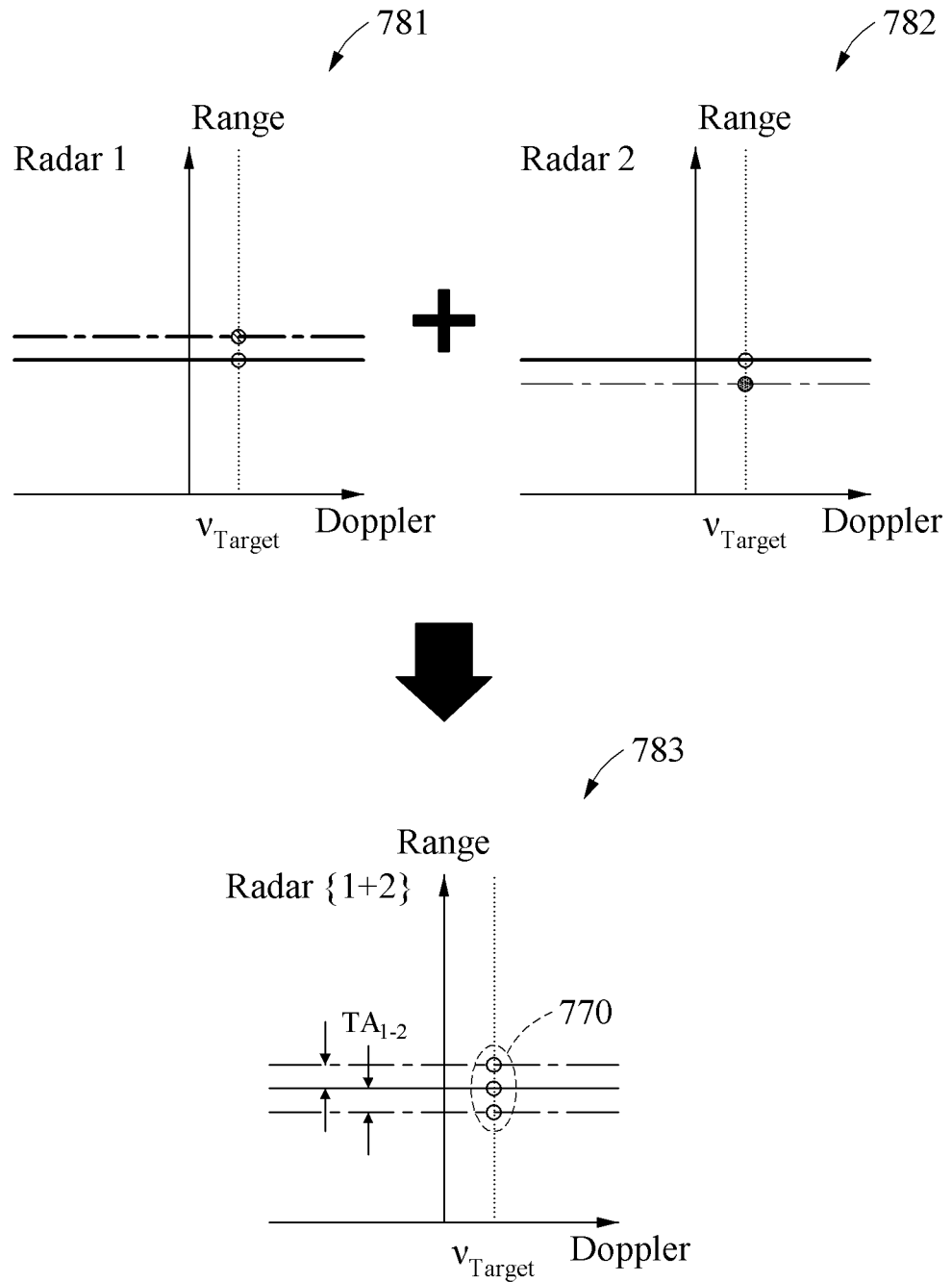
FIG. 7 illustrates an example of merging Doppler maps generated for two radar sensors.

FIG. 7 illustrates an example of merging Doppler maps generated for two radar sensors.

Referring to FIG. 7, a radar operating apparatus merges Doppler maps 781 and 782 generated for radar sensors. A merged Doppler map 783 includes target points sensed by the radar sensors.

In the examples of FIGS. 6 and 7, it is assumed that distances R from radar sensors to an object are sufficiently greater than a distance D between the radar sensors. In response to the distances R being sufficiently greater than the distance D, one of the target points shown in the first Doppler map 781 and one of the target points shown in the second Doppler map 782 overlap. Thus, the merged Doppler map 783 for the two radar sensors shows three target points with respect to the same object.

However, the number of target points with respect to the same object varies according to distances from the radar sensors to the object, azimuths indicated by trajectories of the signals reflected from the object, and the distance between the radar sensors. For example, in response to the distances R not being sufficiently greater than the distance D, the merged Doppler map 783 shows four target points with respect to the same object. An example in which a merged Doppler map shows four target points with respect to the same object will be described with reference to FIGS. 8 and 9.

A radar operating apparatus extracts landmark points 770 from target points shown in Doppler maps generated for a plurality of radar sensors based on Doppler velocities of the target points. For example, the radar operating apparatus extracts, as the landmark points 770, target points between which a Doppler velocity difference is less than a predetermined threshold velocity difference, among the target points. The landmark points 770 are target points indicating the same object, among target points sensed by the radar sensors, and target points having the same Doppler velocity or similar Doppler velocities correspond to the same object. FIG. 7 illustrates the landmark points 770 with respect to a single object. However, the examples are not limited thereto. Landmark points may be extracted by classifying landmark clusters for a plurality of objects.

The radar operating apparatus extracts first landmark points having the same Doppler velocity or similar velocities from the first Doppler map 781 generated for a first radar sensor among the radar sensors. The radar operating apparatus extracts, from the Doppler map 782 generated for a second radar sensor among the radar sensors, second landmark points having velocities similar to those of the first landmark points and being spaced a distance apart from each other in the Doppler map 782. In this example, the distance by which the second landmark points are spaced apart from each other is equal to a distance between the first landmark points.

The radar operating apparatus estimates a time difference between the radar sensors based on the landmark points 770. For example, the radar operating apparatus determines the time difference between the radar sensors based on the distance between the first landmark points and the distance between the second landmark points. In the Doppler map, the distance between the landmark points 770, for example, a difference between values on the vertical axis, is proportional to the time difference between the radar sensors. This is because the radar sensors use radio waves and the radio waves travel at the speed of light.

Figure 8:
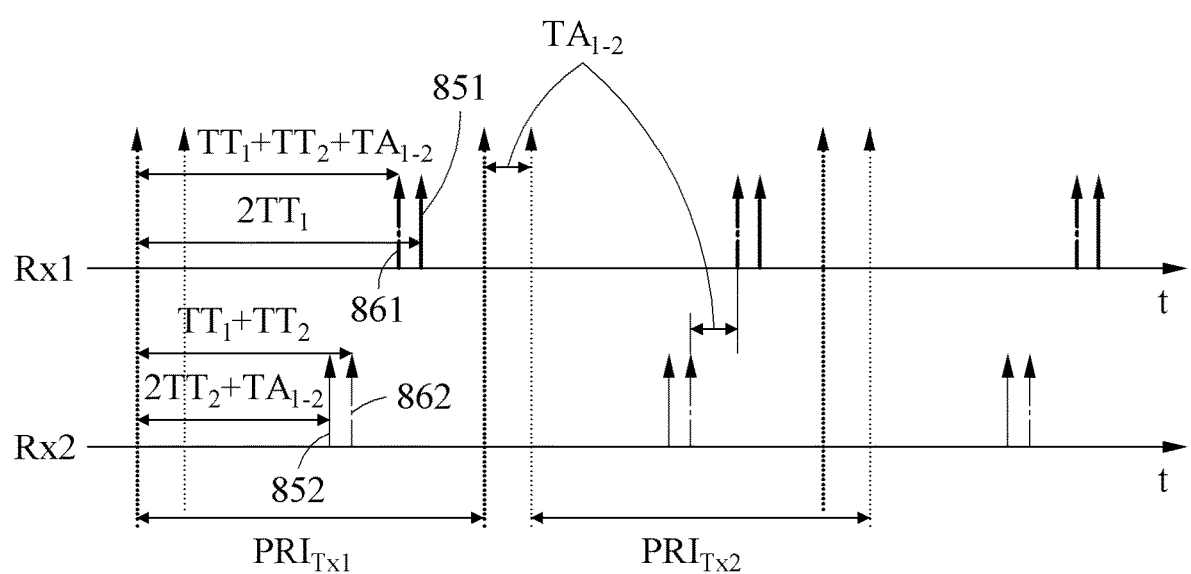
FIG. 8 illustrates an example of points in time at which radar sensors receive signals.

FIG. 8 illustrates an example of points in time at which radar sensors receive signals.

In FIG. 8, an example in which distances R from first and second radar sensors to an object are not sufficiently greater than a distance D between the first and second radar sensors is described. In the example of FIG. 8, a trip time of a signal from the first radar sensor to an object or a trip time of the signal from the object to the first radar sensor is indicated as $TT_1$. A trip time of a signal from the second radar sensor to the object or a trip time of the signal from the object to the second radar sensor is indicated as $TT_2$. $TA_{1-2}$ is a time difference between the first radar sensor and the second radar sensor.

First, the first radar sensor receives a first signal 851 radiated by the first radar sensor itself and reflected from the object. A sum of a trip time of the first signal 851 from the first radar sensor to the object and a trip time of the first signal 851 from the object to the first radar sensor is denoted as $2TT_1$. Further, the first radar sensor receives a third signal 861 radiated by the second radar sensor and reflected from the object. A trip time of the third signal 861 from the second radar sensor to the object is modeled as $TT_2$, and a trip time of the third signal 861 from the object to the first radar sensor is modeled as $TT_1$. The second radar sensor has a delay of $TA_{1-2}$ than the first radar sensor, and thus the first radar sensor receives the third signal 861 at a time of $TT_1+TT_2+TA_{1-2}$.

The second radar sensor receives a second signal 852 radiated by the second radar sensor itself and reflected from the object. Since a round trip time of the second signal 852 is $2TT_2$ and the second radar sensor has the delay of $TA_{1-2}$ than the first radar sensor, the second radar sensor receives the second signal 852 at a time of $2TT_2+TA_{1-2}$. Further, the second radar sensor receives a fourth signal 862 radiated by the first radar sensor and reflected from the object. The second radar sensor receives the fourth signal 862 at a time of $TT_1+TT_2$.

Thus, as shown in FIG. 8, in a situation in which two radar sensors operate, signals received by the radar sensors with respect to the same object represent four target points. In an example in which four target points are shown, the radar operating apparatus estimates a time difference between the radar sensors, which will be described hereinafter with reference to FIG. 9.

Figure 9:
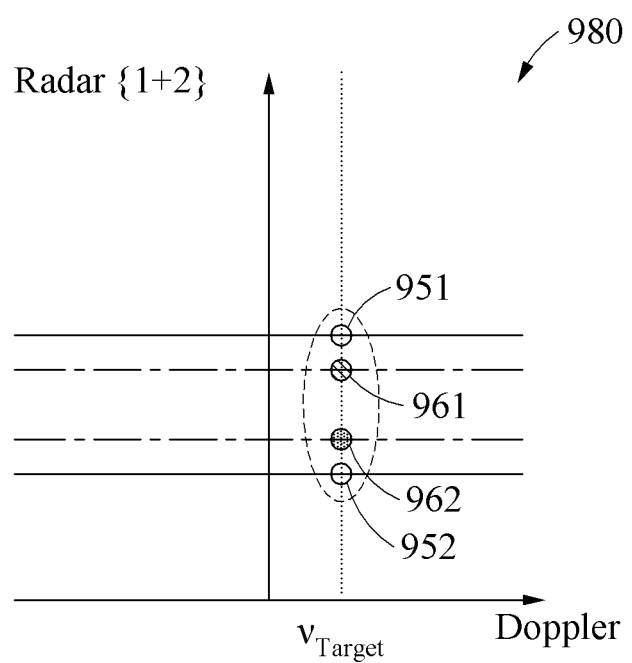
FIG. 9 illustrates an example of a Doppler map corresponding to signals sensed by the radar sensors of FIG. 8.

FIG. 9 illustrates an example of a Doppler map corresponding to signals sensed by the first and second radar sensors of FIG. 8.

Referring to FIG. 9, a radar operating apparatus extracts landmark points 951, 952, 961 and 962 from Doppler maps generated for radar sensors. In the situation assumed in the example of FIG. 8, a Doppler map 980, into which the Doppler maps generated for the first radar sensor and the second radar sensor are merged, includes four target points with respect to the same object. Since target points corresponding to the same object have the same Doppler velocity, the radar operating apparatus extracts the target points having the same Doppler velocity as the landmark points 951, 952, 961 and 962.

The radar operating apparatus estimates a time difference based on points in time at which the radar sensors receive signals reflected from the landmark points 951, 952, 961 and 962. For example, the radar operating apparatus extracts the four landmark points 951, 952, 961 and 962 with respect to the same object and obtains the point in time at which the signals corresponding to the landmark points 951, 952, 961 and 962 are received. In the example of FIG. 9, the first landmark point 951, the second landmark point 952, the third landmark point 961 and the fourth landmark point 962 correspond to the first signal 851, the second signal 852, the third signal 861 and the fourth signal 862 of FIG. 8, respectively. A point in time at which the first signal 851 is received is modeled as $2TT_1$, a point in time at which the second signal 852 is received is modeled as $2TT_2+TA_{1-2}$, a point in time at which the third signal 861 is received is modeled as $TT_1+TT_2+TA_{1-2}$, and a point in time at which the fourth signal 862 is received is modeled as $TT_1+TT_2$. Thus, the radar operating apparatus uses four polynomials. Since there are three variables $TT_1$, $TT_2$, and $TA_{1-2}$ with respect to the four polynomials, the radar operating apparatus calculates a time difference $TA_{1-2}$ based on the points in time at which the signals reflected from the landmark points 951, 952, 961 and 962 are received.

Although an example in which four landmark points 951, 952, 961 and 962 are shown is described with reference to FIG. 9, the disclosure is not limited to such an example. The radar operating apparatus estimates the time difference based on the points in time at which the signals reflected from the landmark points 951, 952, 961 and 962 are received, even in an example in which three landmarks are shown in the merged Doppler map 980.

Figure 10:
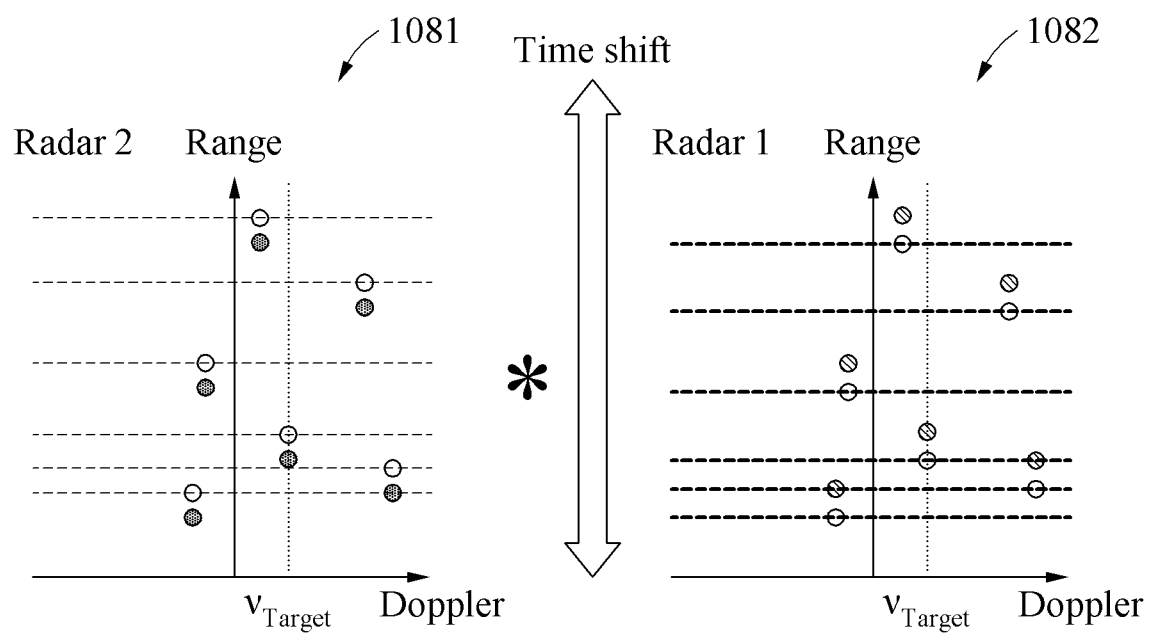
FIGS. 10 and 11 illustrate an example of calculating a correlation between Doppler maps.
Figure 11:
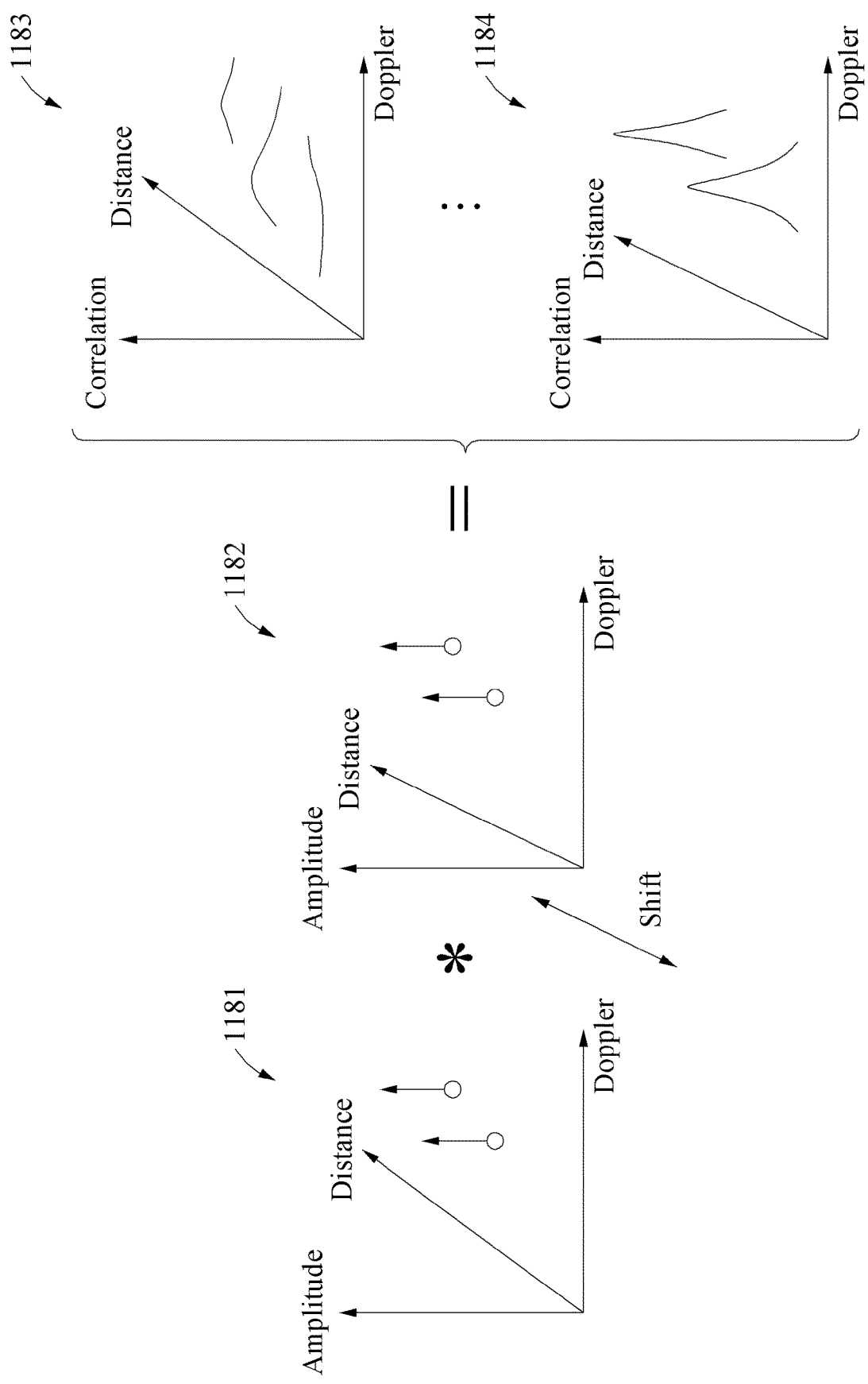

FIGS. 10 and 11 illustrate an example of calculating a correlation between Doppler maps.

A radar operating apparatus estimates a time difference between radar sensors through correlation calculation.

In the example of FIG. 10, target points corresponding to objects are shown in a first the first Doppler map 1081 and a second Doppler map 1082. As described above, target points having the same Doppler velocity or similar Doppler velocities correspond to the same object. The radar operating apparatus extracts landmark points from the target points having the same Doppler velocity or similar Doppler velocities. The radar operating apparatus extracts a landmark cluster for each of the plurality of objects. A landmark cluster with respect to an object is a cluster including landmark points corresponding to the object.

The radar operating apparatus estimates the time difference based on a correlation map between the first Doppler map 1081 generated for a first radar sensor and the second Doppler map 1082 generated for a second radar sensor among the radar sensors. The radar operating apparatus generates correlation maps while shifting one of the first Doppler map 1081 and the second Doppler map 1082 along a distance axis, for example, a vertical axis of the Doppler map.

FIG. 11 illustrates an example of correlation maps.

A radar operating apparatus searches for a correlation map 1184 including peak correlation values among a plurality of generated correlation maps. As shown in FIG. 11, some correlation maps, for example, a correlation map 1183, include no peak correlation value. In an example in which one of a first Doppler map 1181 and a second Doppler map 1182 is shifted such that landmark points shown in the first Doppler map 1181 match landmark points shown in the second Doppler map 1182, peak correlation values are shown. The radar operating apparatus determines the correlation map 1184 having a correlation value exceeding a threshold correlation value to be a peak correlation map.

The radar operating apparatus estimates the time difference based on a correlation map found by the searching, for example, the peak correlation map. For example, the radar operating apparatus determines a distance by which one of the first Doppler map 1181 and the second Doppler map 1182 is shifted to generate the found correlation map. The radar operating apparatus shifts one of the first Doppler map 118 and the second Doppler map 1182 until landmark points shown in the one Doppler map overlap landmark points shown in the other Doppler map. The radar operating apparatus estimates the time difference between the first radar sensor and the second radar sensor based on the distance by which the corresponding Doppler map is shifted. The distance by which the corresponding Doppler map is shifted is proportional to the time difference between the radar sensors.

The radar operating apparatus estimates the time difference between the radar sensors as described with reference to FIGS. 1 through 11 and then performs object detection using the radar sensors based on the estimated time difference.

The radar operating apparatus asynchronously operates the radar sensors. The radar operating apparatus obtains additional information, for example, a more precise contour, associated with the object from the asynchronously operated radar sensors.

For example, a processor of the radar operating apparatus distinguishes, among signals received by each of the radar sensors, a signal radiated from the corresponding radar sensor and a signal radiated from another radar sensor based on the estimated time difference. The processor determines distances to the target points based on the estimated time difference between the radar sensors and points in time at which the signals are received by the radar sensors. The radar operating apparatus obtains a high-resolution contour of the object using the signals radiated at different timings, rather than synchronizing signal radiation timings of the radar sensors.

In another example, the processor synchronizes start times of operating intervals of the radar sensors based on the estimated time difference. For example, the processor minimizes the time difference between the radar sensors by adjusting start times of operating intervals of at least some of the radar sensors. The processor reduces the time difference between the radar sensors to be less than a threshold time. The radar operating apparatus synchronizes the signal radiation timings of the radar sensors, thereby supporting multi-input multi-output (MIMO) processing.

In addition, the processor of the radar operating apparatus compensates for a velocity difference between the radar operating apparatus and another radar operating apparatus and estimates time differences between the radar sensors and radar sensors of the other radar operating apparatus. The radar operating apparatus extends a radar sensing range by cooperating with the other radar operating apparatus. For example, in an example in which the radar operating apparatus is mounted on a vehicle, the radar operating apparatus detects an object by cooperating with another radar operating apparatus mounted on another vehicle.

Further, the processor re-estimates the time difference between the radar sensors in response to a change in an operating interval of at least one of the radar sensors. When the operating interval changes, the time difference between the radar sensors needs to be re-estimated.

Furthermore, the processor of the radar operating apparatus estimates a time difference between a first radar sensor and a second radar sensor among the radar sensors and estimates a time difference between one of the first radar sensor and the second radar sensor and a third radar sensor. Thus, the radar operating apparatus sequentially selects a radar sensor pair from the radar sensors and repeatedly estimates a time difference with respect to the selected radar sensor pair, thereby estimating time differences between all radar sensors.

Figure 12:
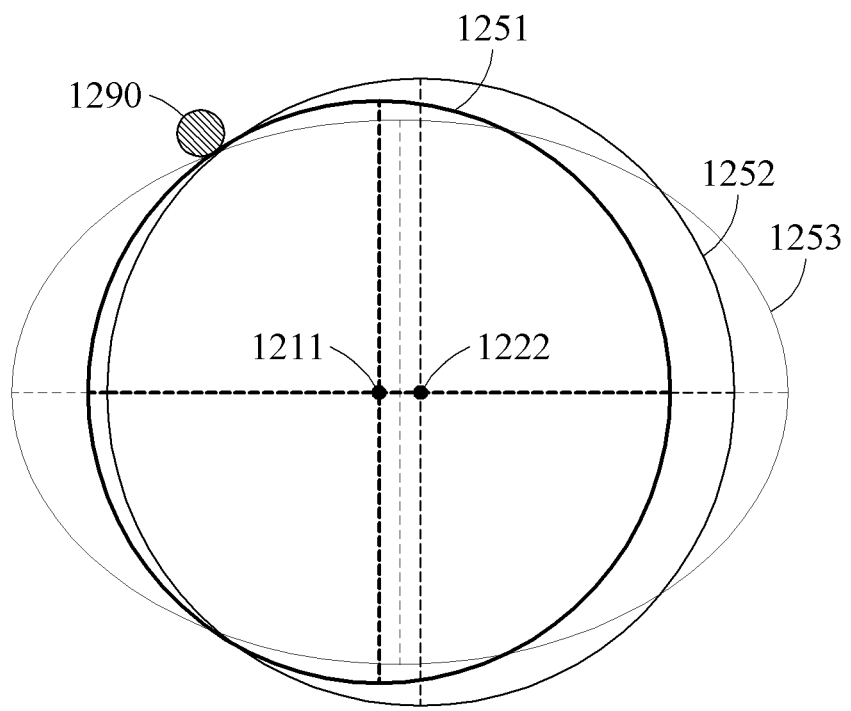
FIG. 12 illustrates an example of viewpoints extended by operations of radar sensors.

FIG. 12 illustrates an example of viewpoints extended by operations of radar sensors.

Referring to FIG. 12, each of a first radar sensor 1211 and a second radar sensor 1222 receives signals radiated by the corresponding radar sensor 1211/1222 and the other radar sensor 1222/1211, and reflected from target points. A processor of a radar operating apparatus detects a contour of an object 1290 by estimating distances to the plurality of target points based on the signals by the corresponding radar sensor 1211/1222 and the other radar sensor 1222/1211. In the example of FIG. 12, the radar operating apparatus detects the contour of the object 1290 based on the first radar sensor 1211 and the second radar sensor 1222. For example, the radar operating apparatus compensates for a distance bias calculated based on a time difference with respect to a homogeneous channel and a heterogeneous channel.

For example, the radar operating apparatus uses a first pattern 1251 detected based on the first radar sensor 1211, a second pattern 1252 detected based on the second radar sensor 1222, and a third pattern 1253 detected based on a cooperation of the first radar sensor 1211 and the second radar sensor 1222. The first pattern 1251, the second pattern 1252, and the third pattern 1253 represent different aspects with respect to the same object 1290. Thus, the radar operating apparatus senses many more target points from the object 1290 through a cooperative driving and individual driving of the first radar sensor 1211 and the second radar sensor 1222. The radar operating apparatus obtains target points sensed according to various aspects of the first and second radar sensors 1211 and 1222. In the example of FIG. 12, the first pattern 1251 and the second pattern 1252 are circular patterns, and the third pattern 1253 is an elliptical pattern. However, the disclosure is not limited to this example.

Further, the processor of the radar operating apparatus generates a surrounding distance map based on signals received by the first and second radar sensors 1211 and 1222. For example, the radar operating apparatus generates the high-resolution surrounding distance map through the many more target points. The surrounding distance map is a map indicating a distance to the object 1290 in the vicinity of the radar operating apparatus.

Figure 13:
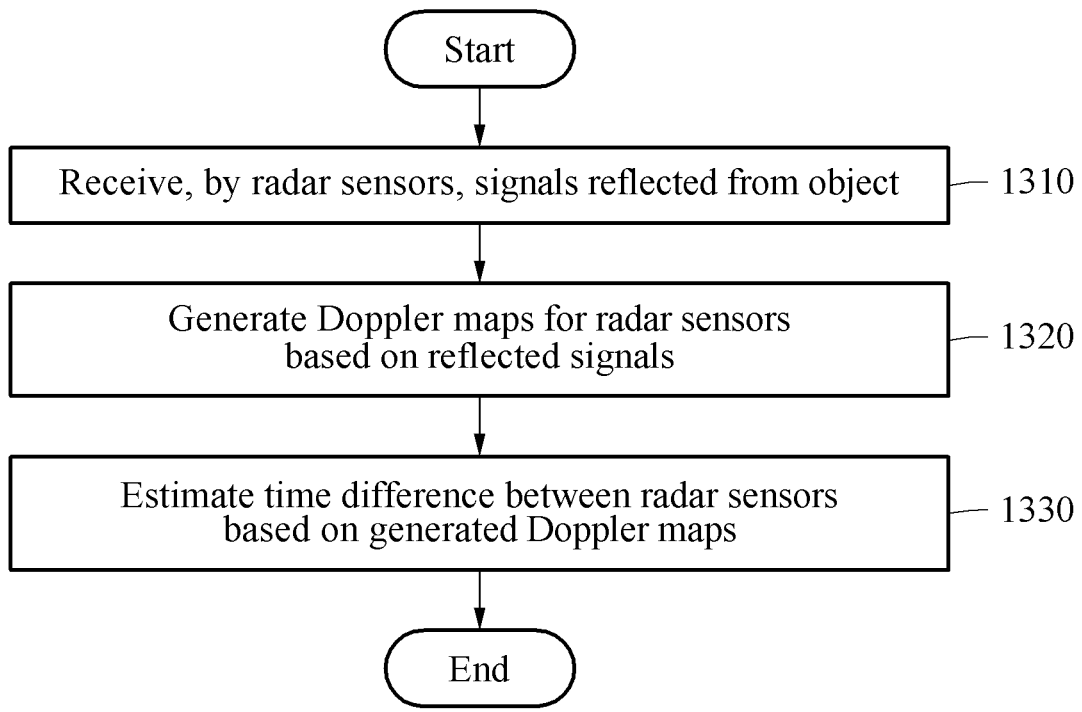
FIG. 13 illustrates an example of a radar operating method.

FIG. 13 illustrates an example of a radar operating method.

Referring to FIG. 13, first, in operation 1310, radar sensors receive signals reflected from an object. For example, each of the radar sensors radiates a signal at each operating interval. Start times of operating intervals of at least some of the radar sensors differ from start times of operating intervals of other radar sensors. Further, lengths of the operating intervals of the radar sensors are the same. However, the operating intervals of the at least some of the radar sensors are different from operating intervals of the other radar sensors.

In operation 1320, a processor generates Doppler maps for the radar sensors based on the reflected signals. For example, the processor generates a Doppler map based on a frequency difference between a signal radiated through a radar sensor and a signal received through the corresponding radar sensor. The processor generates distinguishable Doppler maps for the radar sensors. Further, the processor merges the Doppler maps generated for the individual radar sensors.

In operation 1330, the processor estimates a time difference between the radar sensors based on the generated Doppler maps. For example, among target points shown in the generated Doppler maps, the processor selects points having similar Doppler values as landmark points. The processor estimates the time difference between the radar sensors based on the landmark points.

The radar operating apparatus additionally obtains heterogeneous channel information by estimating the time difference between the radar sensors based on the landmark points having coherent Doppler values. The radar operating apparatus prevents interference between the signals radiated from the radar sensors.

The radar operating apparatus performs a synchronization using the Doppler maps without using a dedicated communication line between the radar sensors. Further, the synchronization is difficult when a length changes according to an arrangement of the dedicated communication line. However, the radar operating apparatus estimates a time difference between radar sensors that can be variably arranged.

The radar operating apparatus concentrates transmission beam patterns of the radar sensors in a predetermined or designated direction, for example, a vehicle travelling direction or a tunnel wall direction. The radar operating apparatus maintains an azimuth in a limited space such as a tunnel by concentrating the transmission beam patterns. The azimuth is an angle formed by a signal of a radar sensor when the signal is reflected from an object. Further, the radar operating apparatus determines a target candidate region on a road and determines an angle of arrival and field of view (AoA FoV) corresponding to the determined target candidate region. The radar operating apparatus uses a radar cross section (RCS) change characteristic according to transmission (Tx) beam steering to detect an azimuth by an actual object on the road from a result of calculating the AoA.

The processor 220 in FIG. 2, the spectrum analyzer 316 in FIG. 3 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 13 that performs the operations described in this application is performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A radio detection and ranging (radar) operating apparatus, comprising:
    a plurality of radar sensors configured to receive signals reflected from an object; and
    a processor configured to: generate Doppler maps for the radar sensors based on the reflected signals, the Doppler maps including information of Doppler velocities associated with the reflected signals;
    extract landmark points between which a Doppler velocity difference based on at least two Doppler velocities calculated from measurements by at least two different radar sensors of the plurality of radar sensors is less than a threshold velocity difference, from among target points included in the Doppler maps;
    estimate a time difference between the radar sensors based on the extracted landmark points using the generated Doppler maps.

2. The radar operating apparatus of claim 1, wherein the processor is further configured to extract first landmark points having similar Doppler velocities from a first Doppler map, among the Doppler Maps, generated for a first radar sensor among the radar sensors, extract second landmark points having Doppler velocities similar to the Doppler velocities of the first landmark points from a second Doppler map, among the Doppler Maps, generated for a second radar sensor among the radar sensors, and determine a time difference between the radar sensors based on a respective distance between the first landmark points in the first Doppler map and a respective distance between the second landmark points in the second Doppler map, wherein the respective distance between the first landmark points in the first Doppler map is equal to the respective distance between the second landmark points in the second Doppler map.

3. The radar operating apparatus of claim 1, wherein the processor is further configured to extract landmark points from the Doppler maps of the radar sensors and estimate the time difference based on points in time at which the radar sensors receive signals reflected from the landmark points.

4. The radar operating apparatus of claim 1, wherein the processor is further configured to estimate the time difference based on a correlation map between a first Doppler map, among the Doppler maps, generated for a first radar sensor among the radar sensors, and a second Doppler map, among the Doppler maps, generated for a second radar sensor among the radar sensors.

5. The radar operating apparatus of claim 4, wherein the processor is further configured to generate correlation maps while shifting one of the first Doppler map and the second Doppler map along a distance axis, search for a correlation map including a peak correlation value among the generated correlation maps, and estimate the time difference based on a correlation map obtained by the searching.

6. The radar operating apparatus of claim 1, wherein the processor is further configured to distinguish, among the signals received by each of the radar sensors, a signal radiated from a respective radar sensor among the radar sensors and a signal radiated from another radar sensor among the radar sensors, based on the estimated time difference.

7. The radar operating apparatus of claim 1, wherein the processor is further configured to determine distances to the target points based on the estimated time difference and points in time at which the signals are received by the radar sensors.

8. The radar operating apparatus of claim 1, wherein the processor is further configured to synchronize start times of operating intervals of the radar sensors based on the estimated time difference.

9. The radar operating apparatus of claim 1, wherein the estimating of the time difference between the radar sensors comprises estimating a time difference between a first radar sensor and a second radar sensor among the radar sensors, and estimating a time difference between a third radar sensor, among the radar sensors, and one of the first radar sensor and the second radar sensor.

10. The radar operating apparatus of claim 1, wherein the processor is further configured to re-estimate the time difference between the radar sensors, in response to a change in an operating interval of at least one of the radar sensors.

11. The radar operating apparatus of claim 1, wherein the processor is further configured to generate the Doppler maps for the radar sensors based on frequency differences between signals radiated by respective radar sensors, among the radar sensors, and the reflected signals.

12. The radar operating apparatus of claim 1, wherein each of the radar sensors is further configured to externally radiate a chirp signal after frequency modulation and receive a chirp signal corresponding to the chirp signal reflected from a target point, and the processor is further configured to determine a distance from each of the radar sensors to the target point based on a frequency difference between the radiated chirp signal and the received chirp signal.

13. The radar operating apparatus of claim 1, wherein the processor is further configured to generate a distance map based on the signals received by the radar sensors.

14. The radar operating apparatus of claim 13, wherein the distance map indicates a distance to the object in a vicinity of the radar operating apparatus.

15. The radar operating apparatus of claim 1, wherein each of the radar sensors is further configured to radiate a modulated chirp signal at a different point in time.

16. The radar operating apparatus of claim 1, wherein each of the radar sensors is further configured to receive signals radiated by the respective radar sensor and another radar sensor and reflected from the target points, and the processor is further configured to detect a contour of the object by estimating distances to the target points based on the signals radiated by the respective radar sensor and the other radar sensor.

17. The radar operating apparatus of claim 1, wherein the processor is further configured to compensate for a velocity difference between the radar operating apparatus and another radar operating apparatus and estimate time differences between the radar sensors and radar sensors of the other radar operating apparatus.

18. A radio detection and ranging (radar) operating method, comprising: receiving, by a plurality of radar sensors, signals reflected from an object; generating Doppler maps for the radar sensors based on the reflected signals, the Doppler maps including information of Doppler velocities associated with the reflected signals; extract landmark points between which a Doppler velocity difference based on at least two Doppler velocities calculated from measurements by at least two different radar sensors of the plurality of radar sensors is less than a threshold velocity difference, from among target points included in the Doppler maps; and estimating a time difference between the radar sensors based on the landmark points using the generated Doppler maps.

19. A non-transitory computer-readable storage medium storing instructions that, when executed by a processor, cause the processor to perform the method of claim 18.

20. A radio detection and ranging (radar) operating method, comprising: radiating, by a first radar sensor, a first signal; radiating, by a second radar sensor, a second signal; receiving, by the first radar sensor, a third signal resulting from the first signal being reflected from an object, and a fourth signal resulting from the second signal being reflected by the object; receiving, by the second radar sensor, the third signal and the fourth signal; generating a first Doppler map for the first radar sensor, based on the third and fourth signals; generating a second Doppler map for the second radar sensor, based on the third and fourth signals, the first Doppler maps and the second Doppler maps respectively including information of Doppler velocities associated with the third and fourth signals; extracting the landmark points between which a Doppler velocity difference based on at least two Doppler velocities calculated from measurements by the first radar sensor and the second radar sensor is less than a threshold velocity difference, from among target points included in the first and second Doppler maps; and estimating a time difference between the first radar sensor and the second radar sensor based on the landmark points using the first Doppler map and the second Doppler map, wherein the time difference is a difference between respective start times of respective operating intervals of the first radar sensor and the second radar sensor.

21. The radar operating method of claim 20, wherein the estimating of the time difference comprises merging the first Doppler map and the second Doppler map to generate a merged Doppler map, extracting, in the merged Doppler map, first landmark points from first target points of the first Doppler map and second landmark points from second target points of the second Doppler map, and estimating the time difference based on the first landmark points and the second landmark points, and wherein a Doppler velocity difference between the first landmark points is less than a threshold velocity difference, and Doppler velocities of the second landmark points are similar to Doppler velocities of the first landmark points.

22. The radar operating method of claim 21, wherein the estimating of the time difference based on the first landmark points and the second landmark points comprises estimating the time difference based on a respective distance between the first landmark points in the merged Doppler map and a respective distance between the second landmark points in the merged Doppler map.

23. A non-transitory computer-readable storage medium storing instructions that, when executed by a processor, cause the processor to perform the method of claim 20.

* * * * *